United States Patent

Yamakado et al.

[11] Patent Number: 6,014,133
[45] Date of Patent: Jan. 11, 2000

[54] DATA TRANSMITTER/RECEIVER APPARATUS, DATA TRANSMITTER, DATA RECEIVER, AND DATA COMPRESSION METHOD

[75] Inventors: Hitoshi Yamakado; Noboru Yanagisawa; Jun-ichi Takenuki, all of Suwa, Japan

[73] Assignee: Seiko Epson Corporation, Tokyo, Japan

[21] Appl. No.: 08/814,716

[22] Filed: Mar. 11, 1997

[30] Foreign Application Priority Data

Jun. 14, 1996 [JP] Japan ................................. 8-154674

[51] Int. Cl.[7] ..................................................... G09G 5/06
[52] U.S. Cl. .......................... 345/199; 345/155; 705/16; 382/165
[58] Field of Search ................................. 345/112, 118, 345/121, 152, 153, 155, 501, 520, 526, 507, 509, 515, 199, 202; 364/479.01, 479.02, 479.06; 705/16, 20–25; 382/162, 165, 166, 232, 244

[56] References Cited

U.S. PATENT DOCUMENTS

| 5,136,695 | 8/1992 | Goldshlag et al. | 345/509 |
|---|---|---|---|
| 5,295,235 | 3/1994 | Newman | 345/433 |
| 5,689,648 | 11/1997 | Diaz et al. | 705/21 |
| 5,715,515 | 2/1998 | Akins, III et al. | 348/6 |
| 5,764,804 | 6/1998 | Yajima et al. | 382/238 |
| 5,796,864 | 8/1998 | Callahan | 382/166 |

FOREIGN PATENT DOCUMENTS

| 62-185413 | 8/1987 | Japan . |
|---|---|---|
| 63-74324 | 4/1988 | Japan . |
| 63-76525 | 4/1988 | Japan . |
| 5-328142 | 12/1993 | Japan . |
| 6-276041 | 9/1994 | Japan . |

OTHER PUBLICATIONS

"Information Technology—Coded Representation of Picture and Audio Information—Progressive Bi–Level Image Compression," *International Standard,* ISO/IEC 11544:1993(e), First Edition, Dec. 15, 1993, pp. 26–51.

*Primary Examiner*—Ulka J. Chauhan
*Attorney, Agent, or Firm*—Oliff & Berridge, PLC

[57] ABSTRACT

A data transmitter/receiver apparatus transmits host computer screen data by wireless interface or by cable to terminal. Also, the screen data is transmitted to the terminal as the bit-mapped data constituting that screen, and screen display is performed. At that time, the bit-mapped data is divided into blocks, converted into indexes having a smaller number of bits than the pixels to transmit, making the number of bits in the indexes representing each block of pixels smaller as the number of colors used within each block is smaller, and compressed before sending; the blocks may be made in units of 10K–50K pixels. Furthermore, only the parts changed in the data composing one screen are detected by comparing with the screen one screen before, and transmits the data of the changed rectangular portion when the changed rectangle detector has detected as a changed rectangle the region computed by $|X1-X2| \times |Y1-Y2|$, taking the vertical and horizontal position of the start of the bit-mapped data in a changed location as X1 and Y1, and the vertical and horizontal position of the end as X2 and Y2.

16 Claims, 14 Drawing Sheets

| BLOCK | # OF COLORS | BIT COUNT OF INDEX | COLOR CONVERSION TABLE |
|---|---|---|---|
| 4a | 4 | 2 | 4 BYTES |
| 4b | 16 | 4 | 16 BYTES |
| 4c | 20 | 8 | NONE |
| 4d | 3 | 2 | 4 BYTES |
| 4e | 8 | 4 | 16 BYTES |
| 4f | 10 | 4 | 16 BYTES |
| 4g | 30 | 8 | NONE |
| 4h | 1 | 2 | 4 BYTES |
| 4i | 9 | 4 | 16 BYTES |
| 4j | 17 | 8 | NONE |

| BLOCK | # OF COLORS | BIT COUNT OF INDEX | COLOR CONVERSION TABLE |
|---|---|---|---|
| 4a | 4 | 2 | 4 BYTES |
| 4b | 16 | 4 | 16 BYTES |
| 4c | 20 | 8 | NONE |
| 4d | 3 | 2 | 4 BYTES |
| 4e | 8 | 4 | 16 BYTES |
| 4f | 10 | 4 | 16 BYTES |
| 4g | 30 | 8 | NONE |
| 4h | 1 | 2 | 4 BYTES |
| 4i | 9 | 4 | 16 BYTES |
| 4j | 17 | 8 | NONE |

FIG.7

| # OF COLORS | COLOR CONVERSION TABLE | BIT COUNT OF INDEX |
|---|---|---|
| ≤4 | 4 BYTES | 2 BITS |
| ≤16 | 16 BYTES | 4 BITS |
| ≥17 | NONE | 8 BITS |

FIG.8

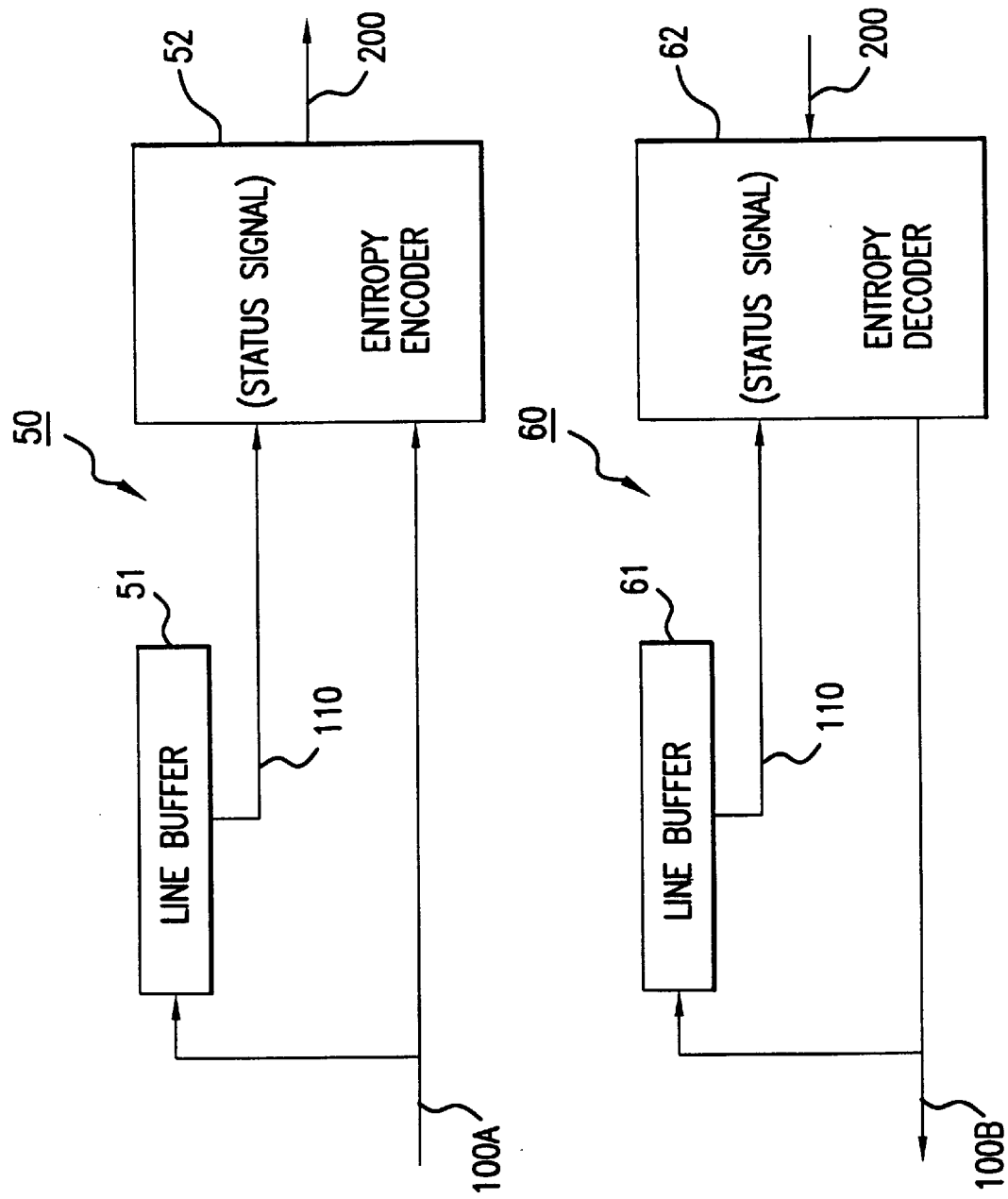
FIG.16 "PRIOR ART"

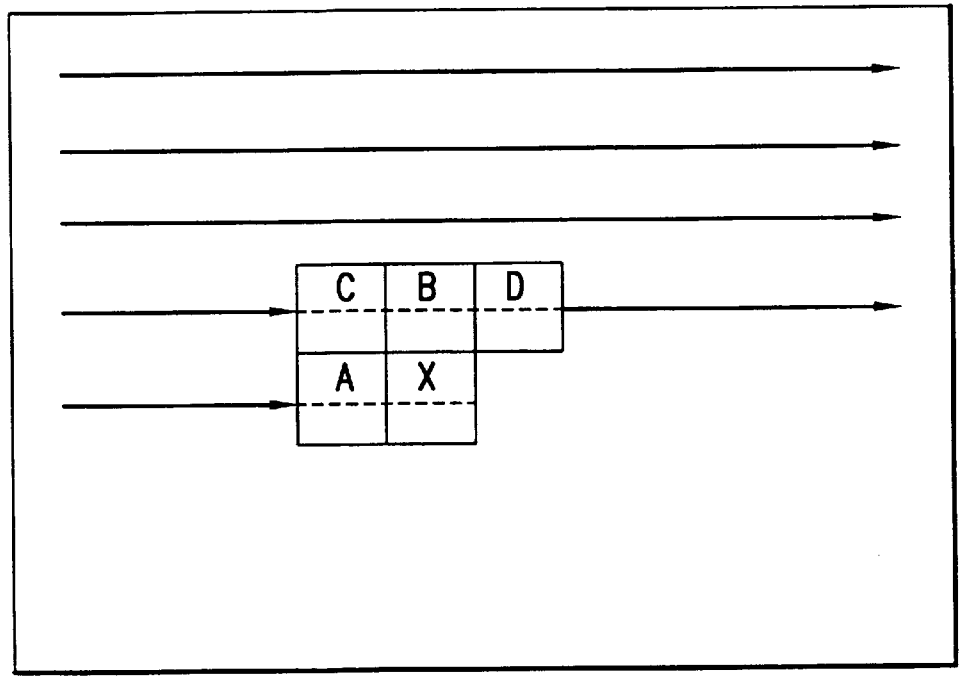
FIG.17 "PRIOR ART"
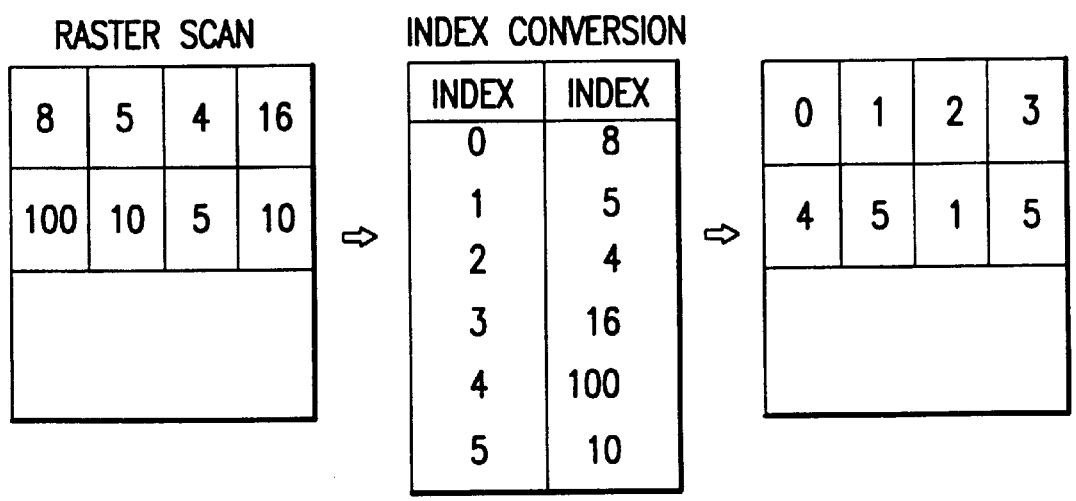
FIG.18 "PRIOR ART"

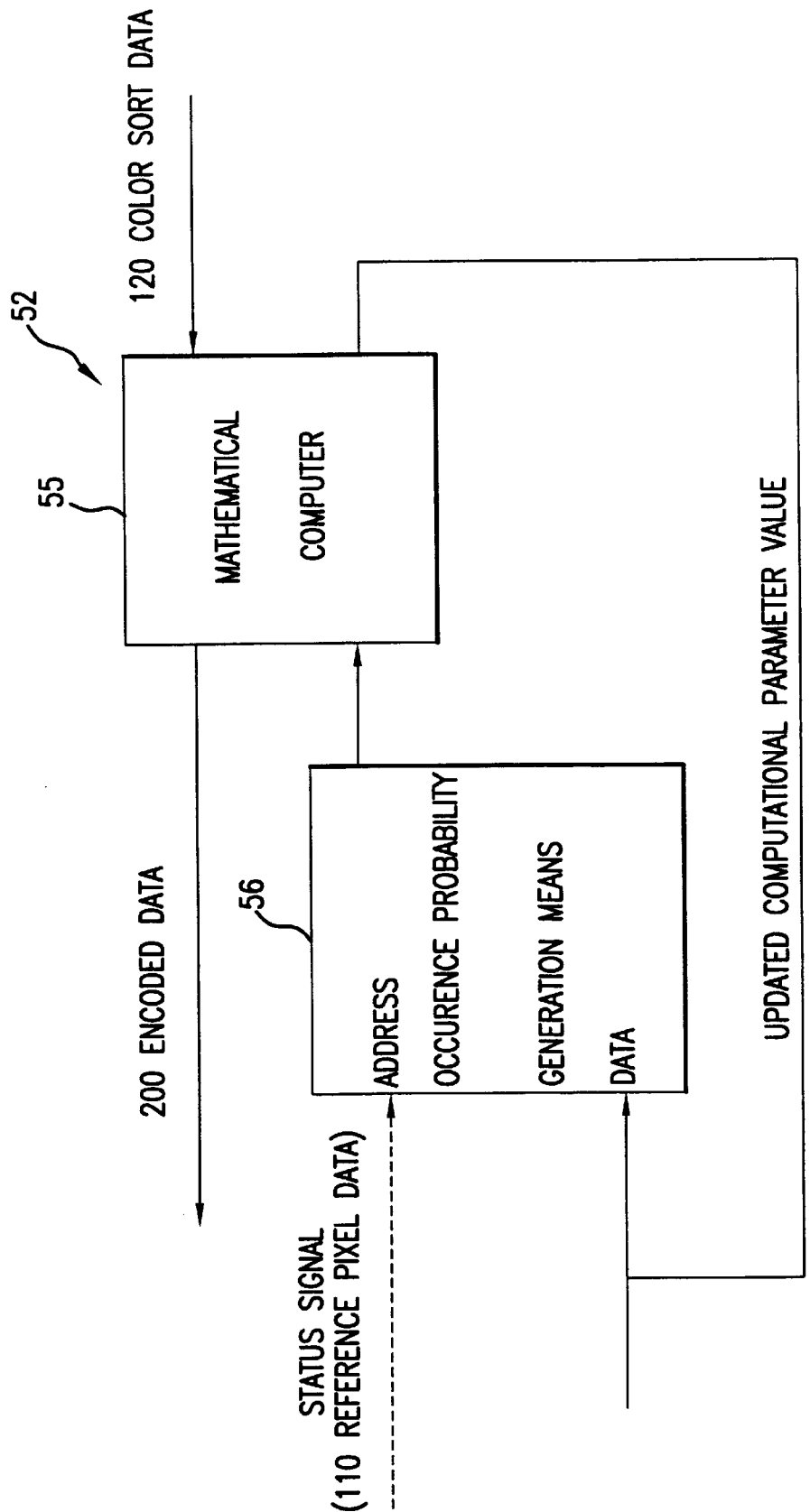
FIG.19 "PRIOR ART"

DATA TRANSMITTER/RECEIVER APPARATUS, DATA TRANSMITTER, DATA RECEIVER, AND DATA COMPRESSION METHOD

BACKGROUND OF THE INVENTION

1. Field of Invention

The present invention relates to equipment that transmits and receives data and a data compression method. Particularly, it relates to an improved data transmitter/receiver apparatus that is best applied when remotely operating a remote host computer over a LAN (local area network).

2. Background Technology

Conventionally, when remotely operating a remote host computer over a LAN, it is necessary to transfer the screens of the remote host computer to the terminal performing the remote operation. When performing such transfers, the terminal must possess a similar configuration as the host computer. An example hardware and software configuration requires a high-performance CPU (central processing unit), increased memory, a HDD (hard disk device), wireless and/or cable interface equipment, and various types of high-performance OSS (operating systems) and terminal applications, and the like.

Also, when performing in-shop tasks, such as product re-shelving and inventory management, the status of the work of product location and inventory counts should be confirmed. In these cases, independent, portable terminal devices are acquired and operated separately from the POS (point-of-sale) terminals such as the registers located in the shop.

Meanwhile, computers and game devices conventionally use multicolored images. These multicolored images, also called alternate colors and restricted colors, as shown in FIG. 15, are images restricted to 16 colors or 256 colors, by providing an index for a specific color; that is, a color having a specific R (red), G (green), and B (blue) value.

If each color R, G, and B is represented by eight bits (256 types), then their multicolored images require a total of 24 bits. However, because the index itself also is displayed with eight bits, a compression ratio is required even though the amount of information is still great. Without extra processing, simple data compression is not practical due to the substantial volume of memory and the decreasing communications processing speed. Consequently, data compression technology becomes extremely important for multicolored images as well as with other image data and text data. Particularly, since multicolored images have their number of colors restricted, reversible compression technology, such as encoding and decoding, that is capable of reducing lost data is necessary.

Recently, industry has been focused on technology using an entropy encoder and decoder as one type of data compression method. In other words, there are those in industry using mathematical encoding and decoding to compress data. Overviews of this technology are published in, for example, Japanese Patent Laid-Open No. 62-185413, Japanese Patent Laid-Open No. 63-74324, and Japanese Patent Laid-Open No. 63-76525.

In FIG. 16, a prior-art multicolored image encoding system 50 and decoding system 60 using such technology are shown. The encoding system 50 includes a line buffer 51 and an entropy encoder 52. The input index data, that is, color pixel data 100A, is input into line buffer 51 and entropy encoder 52. This color pixel data 100A, as shown in FIG. 17, is input successively by raster scanning in horizontal scanning order. Methods of creating this color pixel data 100A, apply an index to the sequence number of the input color, as shown in FIG. 15, and a phenomenon appears that those having near index numbers, such as "1" and "2," actually have their colors greatly different from each other, and those having far index numbers, such as "100" and "200," have their colors close to each other. In order to avoid such a phenomenon, as shown in Japanese Patent Laid-Open No. 5-328142, an index system that assigns consecutive numbers to close colors is used.

The line buffer 51 in the encoding system 50 generates reference pixel data A, B, C, and D as the reference pixel generator for encoded object pixel X from the previously input color pixel data 100A (see FIG. 17). For example, line buffer 51 stores an n-line (where n, for example, is 1–5), history when scanning an image. Also, for each color pixel data 100A of the encoding object pixel X input, a series of pixel data composed of the immediately preceding pixel A and the peripheral pixels B, C, and D are output as reference pixel data 110 toward entropy encoder 52.

This entropy encoder 52 is formed using methods such as mathematical encoding or Huffman encoding. Reference pixel data 110 is used for status signals to convert the color pixel data 100A into encoded data 200.

Meanwhile, decoding system 60 is constructed including line buffer 61 and entropy decoder 62. Here, line buffer 61 and entropy decoder 62 are formed to decode and output the input encoded data 200 by a procedure entirely opposite to line buffer 51 and entropy encoder 52 of coding system 50.

In this manner, both encoding system 50 and decoding system 60, using mutually and entirely opposite algorithms, can encode color pixel data 100A into encoded data 200, and can further decode and output this encoded data 200 into color pixel data 100B and. Accordingly, this system can be used for various purposes.

In such a system, as the value of color pixel data 100A, that is, the index number, approaches the vicinity of a fixed number, its data compression rate is increased. Also, in this system, reference pixel data 110 is used as a status indicator of entropy encoder 52 and entropy decoder 62. Consequently, if the reference pixel number is substantial, the data compression rate is similarly increased. Thus, when configuring entropy encoder 52 and decoder 62, when there is a great tendency toward the probability of occurrence of the symbols 0 or 1, it is possible to increase the data compression rate. This is because, in entropy encoding technology, short encoded data is allocated for inputs having a high probability of occurrence, and relatively long encoded data is allocated for inputs having a low probability of occurrence.

In addition, run-length encoding technology is known as a means of encoding signals of the values 0 or 1. This is, as explained above, a means of increasing the data compression rate by using the tendency of the probability of occurrence of 0 or 1.

Also, in image compression technology, there is a method of rearranging index numbers according to the order of frequency of appearance, by computing the tendency of the frequencies of appearance of the object color symbols, that is, the index numbers corresponding to the colors (Japanese Patent Laid-Open No. 6-276041). Short encoded data is allocated for inputs having a high frequency of appearance, and the compression rate is increased.

When using the frequency of appearance indicated as the prior-art technology for index conversion and data compression methods shown in FIG. 15 and FIG. 18, there are those that assign numbers in the order the image data is scanned. The index conversion shown in FIG. 15 and FIG. 18 increases the compression rate to some extent, as do those using the frequency of appearance. This is because, as is clear when comparing the first section of FIG. 18, showing the index before conversion, and the last section of FIG. 18, showing the index after conversion, in indexes of small numbers a trend of concentration and an index tendency occur.

By the way, such a common method of mathematical encoding and decoding is already described in detail on p. 26–44 and p. 44–50 of the Image Encoding Standard (International Standard ISO/IEC11544), but here it is explained simply as a premised technology when developing the present invention described below.

One example of the mathematical encoding-type entropy encoder 52 used in FIG. 16 is shown in FIG. 19. Because the configuration of the mathematical decoding-type entropy decoder 62 is identical to the configuration of the entropy encoder 52, explanation of that is omitted here.

This entropy encoder 52 is configured including an mathematical computer 55 and an occurrence probability generator 56 functioning as a status recorder. Into this occurrence probability generator 56 are written status parameters necessary for determining the symbol occurrence probabilities necessary for encoding. The status parameters are specified by input status symbols. Also, the mathematical computer 55 reads data during updates of the computational parameters and outputs the addresses, referring to a status parameter table specified by these status symbols, and the data of the occurrence probability generator 56 toward the mathematical computer 55. The mathematical computer 55 converts the input color ranking data 120 into encoded data 200 based on the data inputs, and outputs. In this manner, the index-converted data, which may be the color ranking data 120, is compressed and encoded.

The conventional terminal for remote operations consist of heavy equipment having functions equivalent to the host computer, which as a result, become high-priced items. Also, the driving applications also must be unified, and if other applications are used, the exchangeability of the data becomes difficult to manage. Especially, during data transfer, it is most common to conduct the transfer using commands specific to that OS and application, and interpretation of the commands becomes impossible with machines using different OSs or applications. Thus, the conventional terminal and the host computer are not good in interfacing with other machines, other data, and the like.

Further, the conventional terminal must have a CPU with equivalent functions to be link up with the CPU used in the host computer. Because application software and the underlying OS are advancing pursuant to advances of the CPU, when the CPU of the host computer is upgraded in functionality, the application software and underlying OS, not to mention the CPU, of the terminal also must be upgraded. As a result, in addition to the costs soaring, the installation work of various types of software becomes burdensome.

In addition, because the conventional terminal downloads host computer data into the terminal, valuable data may be stolen if the terminal is stolen. Also, because the compatibility with the data in the host computer is lost if the data is tampered with on the terminal end, a great deal of consideration must be made regarding the handling of the data. That is, data security operations are necessary and a nuisance.

Also, when performing product re-shelving operations and inventory management operations, which are conventional in-shop tasks, it is necessary to acquire portable terminals separately from the POS terminals, and operators also must be appropriately positioned. Thus, the cost of human resources increases, and it becomes an expensive system. Also, because the number of POS terminals furnished is determined based on the number of afternoon, evening and weekend customers, the POS terminals are vacant during other time slots when there are fewer customers. Because conventional portable terminals are unrelated to POS terminals, and they execute applications independently, they do not cure the inactive times of the POS terminals.

Furthermore, the conventional image data compression technology using reference pixel data has a relatively high compression rate, and it is necessary to use an encoding parameter table of a size comparable to the number of states of the reference pixel data. Therefore, as the number of reference pixels is increased in order to handle the increased compression rate, the parameter tables for encoding and decoding increase. Accordingly, the problem is created that the entropy encoder 52 and entropy decoder 62 become large-scale and more expensive.

Meanwhile, methods of sorting index numbers in order of frequency of appearance by computing the tendency of frequency of appearance of the index numbers corresponding to the colors, and methods of assigning numbers in the order of the image data scanned are desirable as simple index conversions for increasing the compression rate. However, in spite of the images generally having a tendency due to their positions on the screen, making the objects and colors (indexes) of the whole screen is necessary, and the actual compression rate is small.

The present invention aims to provide a data transmitter and data receiver, along with a data transmitter/receiver apparatus, which, in addition to being able to make the terminal lighter, reduces concerns of data theft or of the CPU becoming obsolete. Installation work of applications, etc., and allowances for security are not required. Also, the present invention aims to provide a data transmitter and data receiver, along with a data transmitter/receiver apparatus, which is capable of transmitting and receiving compressed data easily and efficiently. Furthermore, the present invention aims to provide a data compression method which is capable of compressing bit-mapped data easily and efficiently.

SUMMARY OF THE INVENTION

It is therefore an object of the present invention to provide a data transmitter/receiver apparatus that transmits screen data by wireless interface or by cable to a terminal, wherein the screen data is transmitted to the terminal as bit-mapped data constituting the screen, and is displayed on the screen of the terminal.

The screen data is transmitted to the terminal as bit-mapped data, thus the terminal ceases to require an HDD and high-performance OS, and the like, and can become lighter and compact at a lower price. Moreover, because the data operated at the terminal end is data which exists in the host at the transmitting end, it is not necessary to consider the compatibility of the data on the transmitting end and the data on the terminal end. Also, even if the terminal is damaged or is stolen, the fundamental data is safe. In addition, because the terminal handles simple bit-mapped data, and uses a low-priced CPU, it is also possible to maintain the functional value of that CPU for a long time. Further, because the handled data is bit-mapped data, the task of installing high-performance application software becomes unnecessary and it is easier to place an interface between the transmitting equipment and the terminal.

It is a further object of the present invention to provide a data transmitter/receiver apparatus, wherein the bit-mapped data is divided into blocks, converted into indexes having a smaller number of bits, thus making the number of bits in the indexes representing each block of pixels smaller as the number of colors used within each block decreases, and compressed prior to transmission. As a result, the divided block may be composed of an extremely small number of colors. In that case, the compression rate for that block becomes higher, and the data transmission time is shortened.

It is an even further object of the present invention to provide a data transmitter/receiver apparatus that transmits host computer screen data by wireless interface or by cable to a terminal, wherein, the screen is divided into blocks while bit-mapping the screen data, and the pixel data to be transmitted is converted into indexes having a smaller number of bits than the pixels to transmit, making the number of bits in the indexes representing each block of pixels smaller as the number of colors used within each block decreases, and compressed prior to transmitting the bit-mapped data to the terminal and displaying it on the screen.

In this manner, because the screen data is transmitted to the terminal as bit-mapped data, the terminal ceases to require a HDD and high-performance OS, and the like, and can become lighter equipment and lower cost. Moreover, because the data operated at the terminal end is data which exists in the host at the transmitting end, it is not necessary to consider the compatibility with the screen data on the transmitting end. Also, even if the terminal is damaged or is stolen, the underlying screen data is meaningless, and problems do not arise. In addition, because the terminal handles simple screen data, being bit-mapped data, along with being able to use a low-priced CPU, it is also possible to maintain for a long time the functional value of that CPU. Further, because the handled data is bit-mapped data, the task of installing high-performance application software becomes unnecessary, and it is easier to place an interface between the transmitting equipment and the terminal.

It is an even further object of the present invention to provide a data transmitter/receiver apparatus wherein the bit-mapped data is divided into blocks in units of 10K–50K pixels. Because of this, one screen becomes divided into multiple blocks, and the images, etc., are compressed with high efficiency when there are color tendencies throughout the one screen. In ordinary screens, color tendencies occur according to their position on the screen, that is, depending on the block, even in images composed of multiple colors, it is often that they are composed of multiple types of colors, which increases the compression rate.

It is an even further object of the present invention to provide a data transmitter/receiver apparatus that transmits screen data by wireless interface or by cable to a terminal, wherein the screen is bit-mapped, and the data transmitter/receiver apparatus comprises a changed rectangle detector that detects only the portions changed in the data composing one screen by comparing the screen with the data of the previous screen, and transmits the data of the changed rectangular portion when the changed rectangle detector has detected as a changed rectangle the region computed by $|X1-X2| \times |Y1-Y2|$, taking the vertical and horizontal position of the start of the bit-mapped data in a changed location as X1 and Y1, and the vertical and horizontal position of the end as X2 and Y2.

As discussed above, the screen data is transmitted to the terminal as bit-mapped data, thus the terminal ceases to require an HDD and high-performance OS, and the like, and can become lighter and less expensive. Moreover, because the data operated at the terminal end is data which exists in the host at the transmitting end, it is not necessary to consider the compatibility of the data on the transmitting end and the data on the terminal end. Also, even if the terminal is damaged or is stolen, the fundamental data is safe, and problems do not arise. In addition, because the terminal handles simple bit-mapped data, along with being able to use a low-priced CPU, it is also possible to maintain for a long time the functional value of that CPU. Furthermore, because the handled data is bit-mapped data, the task of installing high-performance application software becomes unnecessary, and it is also easier to place an interface between the transmitting equipment and the terminal. In addition, in this invention, changed portions are handled as changed rectangles, and the data of those portions is transmitted to the receiver, the transmission efficiency of the screen data increases.

It is an even further objective of the present invention to provide a data transmitter/receiver apparatus having an unchanged signal generator that generates when there is an unchanged rectangle not changed among the changed rectangles and a signal indicating that the unchanged rectangular region is identical to the previous screen. The transmission efficiency of the screen data is increased because the unchanged portions among the changed rectangles are transmitted as a small quantity of data.

It is an even further objective of the present invention to provide a data transmitter/receiver apparatus having a bit-mapped data divided into blocks in units of 10K–50K pixels, and having changed rectangles obtained within those divided blocks. It is possible to obtain changed rectangles for each divided block. Thus, while one screen is divided into an extent of ten blocks, the changed locations in an ordinary image are limited such that the changed rectangles occur only in a few of the blocks in one screen. This further increases the transmission efficiency of the screen data.

It is an even further objective of the present invention to provide a data transmitter/receiver apparatus having a color number detector that detects the number of colors among the changed rectangles, an index converter that makes the number of bits in the indexes representing each block of pixels as indexes having a value of a smaller number of bits when the number of colors detected by this color number detector is smaller, and a data compressor that compresses the bit-mapped data using these new indexes. Therefore, depending on the changed rectangle, there are occurrences where the number of colors is extremely few, and it is possible to determine the indexes of those colors as a small bit count value. As a result, it is possible to increase the image compression rate and the transmission efficiency of the screen data.

Another objective of the present invention is to provide a data compression method, wherein, a screen is represented as bit-mapped data, the data to be compressed is made into indexes having a smaller number of bits, making the number of bits in the indexes representing each block of pixels smaller as the number of colors used within fixed regions of each screen is smaller, and the bit-mapped data in the fixed regions is compressed.

Therefore, if the number of colors used within the fixed regions of the screen is few, the values of the indexes that represent the colors become small, and the compression rate is increased. In this manner it is possible to perform efficient data compression using an extremely simple method.

It is a further objective of the present invention to provide a data compression method having screens divided into blocks in units of 10K–50K pixels, where each of those divided blocks becomes the fixed region. In this manner, when a block is divided into units of 10K–50K pixels, that is, in the case of one screen being 640×480 bits when dividing one part of several parts into one part of several tens of parts, if there is a color tendency in the one screen, the image data, etc., can be efficiently compressed. In ordinary screens, color tendencies occur, that is, even for image data composed of many colors, by blocks, it is common that the image data is composed of a genuinely sparse number of colors, and commonly, the compression rate is increased in almost all screens.

It is an even further objection of the present invention to provide a data compression method that compresses data by extracting only the data of the parts changed in the data composing one screen by comparing the screen with the data of a previous screen, wherein the screen is bit-mapped, and the bit-mapped data of the changed rectangular region computed by $|X1-X2| \times |Y1-Y2|$, taking the vertical and horizontal position of the start of a changed location of the bit-mapped data as X1 and Y1, and the vertical and horizontal position of the end as X2 and Y2, is compressed.

The changed portions are handled as bit-mapped data of changed rectangles, thus, the data compression does not become a special matter, and it can be performed efficiently. Also, because it is compressed as bit-mapped data, when transmitting the compressed data, for example, to the terminal, the terminal ceases to require an HDD and high-performance OS, and the like, and can become lighter and lower priced equipment. Moreover, because the data operated at the terminal end is data which exists in the host at the transmitting end, it is not necessary to consider the compatibility of data on the transmitting end and on the terminal end. Also, even if the terminal is damaged or stolen, the fundamental data is safe, and security problems do not arise. In addition, because the terminal handles simple data, being bit-mapped data, along with being able to use a low-priced CPU, it is also possible to maintain for a long time the functional value of that CPU. Further, because the handled data is bit-mapped data, the task of installing high-performance application software becomes unnecessary and it is easier to place an interface between the hardware.

It is an even further objective of the present invention to provide a data compression method wherein, when there is an unchanged rectangle among the changed rectangles, a signal is generated indicating that the unchanged rectangular region is identical to the previous screen. In this manner, because the data of the unchanged portions among the changed rectangles are compressed as a small quantity of data, the compression rate of the screen data is further increased.

It is an even further objective of the present invention to provide a data compression method wherein the bit-mapped data is divided into blocks in units of 10K–50K pixels, and the changed rectangles are obtained in those divided blocks. Therefore, it is possible to obtain changed rectangles for each divided block. For example, while one screen is divided into about ten blocks, because the changed locations in an ordinary image are limited, the changed rectangles occur only in a few of the blocks in one screen. Therefore, the transmission efficiency of the screen data is further increased.

It is an even further objective of the present invention to provide an image data compression method wherein when the number of colors among the changed rectangles is detected, the indexes representing each block of pixels are made as indexes having a smaller number of bits because the number of colors is smaller, and the bit-mapped data is compressed using those indexes. In this manner, because the data is compressed by assigning indexes with values as small as the number of colors within the changed rectangles, the data compression rate is increased.

It is another objective of the present invention to provide a data transmitter that transmits host computer screen data by wireless interface or by cable to a terminal, comprising a screen memory that structures the host computer screens with bit-mapped data and stores that bit-mapped data, a changed rectangle detector that detects changed regions against the previous screen in the screen data, a bit map holder that acquires the bit-mapped data of the changed regions from the screen memory, a color number detector that detects the number of colors among the changed regions of the bit-mapped data, an index converter that makes the indexes representing each block of pixels as indexes having a value of a smaller number of bits as the number of colors detected by this color number detector decreases, a data compressor that compresses the bit-mapped data using the indexes provided by this index converter, and a transmitter that transmits the data compressed by this data compressor.

Because the screen data can be transmitted to the terminal as bit-mapped data, the terminal ceases to require an HDD and high-performance OS, and the like, and can become lighter and lower priced equipment. Moreover, because the data operated at the terminal end is data which exists in the host at the transmitting end, it is not necessary to consider the compatibility of data on the transmitting end and on the terminal end. Also, even if the terminal is damaged or is stolen, the fundamental data is safe, and security problems do not arise. In addition, because the terminal handles simple bit-mapped data, and is able to use a low-priced CPU, it is possible to maintain the functional value of that CPU for a long time. Furthermore, because the handled data is bit-mapped data, the task of installing high-performance application software becomes unnecessary, and it is possibly easier to place an interface between it and the receiver, etc. In addition, because only the changed regions are sent as data, the transmission efficiency is increased. Furthermore, when the number of colors is few in the changed regions, the compression rate increases, and the transmission efficiency is further improved.

It is a further objective of the present invention to provide a data transmitter wherein the bit-mapped data stored by the screen memory is stored as data having a 1024×786 bit map. Therefore, stored large-screen data can be displayed.

It is an even further objective of the present invention to provide a data transmitter wherein the changed regions detected by the changed rectangle detector is a block obtained by dividing the screen into a plurality of blocks. In this manner, because the changed regions are detected among the divided blocks within one screen, the compression rate of the transmitted data can be increased. That is, because there may be entirely no changed portions or their number of colors may be extremely few, depending on the block, in addition to reducing the transmitted data, the compression rate is increased, and the efficiency of data transmission is greatly improved.

It is an even further objective of the present invention to provide a data transmitter that transmits host computer screen data by wireless interface or by cable to a terminal, comprising a screen memory that provides the host computer screens with bit-mapped data and stores that bit-mapped data, a changed rectangle detector that detects changed regions against the previous screen of screen data, a bit map holder that acquires the bit-mapped data of the changed regions from the screen memory, a data compressor that compresses the bit-mapped data of the changed regions, and a transmitter that transmits the data compressed by this data compressor, the change detector including a changed rectangle detector that detects as a changed region the changed rectangular region computed by $|X1-X2|\times|Y1-Y2|$, taking the vertical and horizontal position of the start of the changed location of the bit-mapped data as X1 and Y1, and the vertical and horizontal position of the end as X2 and Y2.

The screen data can be transmitted to the terminal as bit-mapped data, and thus, the terminal ceases to require an HDD and high-performance OS, and the like, and can become lighter and lower priced equipment. Moreover, because the data operated at the terminal end is data which exists in the host at the transmitting end, it is not necessary to consider the compatibility of the data on the transmitting end and on the terminal end. Also, even if the terminal 11 [sic] is damaged or is stolen, the fundamental data is safe, and problems do not arise. In addition, because the terminal handles simple bit-mapped data and is able to use a low-priced CPU, it is possible to maintain the functional value of that CPU for a long time. Furthermore, because the handled data is bit-mapped data and the task of installing high-performance application software becomes unnecessary, it is also easier to place an interface between it and the receiver, etc. In addition, because only the changed regions are sent as data, the transmission efficiency is increased. Furthermore, when the number of colors is few in the changed regions, the compression rate increases, and the transmission efficiency is improved. In addition, because the changed regions are made as changed rectangles, and the data of those portions is already sent, the transmission efficiency is increased.

It is an even further objective of the present invention to provide the data transmitter further comprising a color number detector that detects the number of colors in the changed rectangles, and an index converter that provides to each block of pixels an index of a different number of bits according to the number of colors detected by this color number detector. In the changed rectangle detector when there is an unchanged rectangle not changed within the changed rectangles, generates a signal indicating that the unchanged rectangular region is identical to the previous screen, the color number detector detects the number of colors for the rectangular regions other than the unchanged rectangular regions, and the index converter assigns to the indexes representing each block of pixels a value of a smaller number of bits as the number of colors detected decreases.

Therefore, the volume of data of the unchanged rectangular regions among the changed rectangles decreases. Also, the number of colors outside those unchanged rectangular regions is detected, and if the number of colors is few, the index values also decreases, and the data compression rate is increased. As a result, even when transmitting the same screen, it is possible to transmit the data in a short time when using this data transmission system.

It is an even further objective of the present invention to provide a data receiver comprising a receiver that receives the bit-mapped data composing the screens, a data expander that expands that bit-mapped data, a color number converter that specifies each index, based on a signal indicating the number of colors in each specified block of the bit-mapped data, wherein the index representing each block of pixels is assigned a bit number that decreases as the number of colors detected gets smaller, a screen memory that stores the bit-mapped data based on the pixels for which color is specified by this color number converter, and a display that displays the bit-mapped data stored by this screen memory.

The screen data is received as bit-mapped data, thus, the data receiver no longer requires an HDD and a high-performance OS, and the like, and can become lighter and more economical. Moreover, because the data operated at the terminal end is data which exists in the host at the transmitting end, it is not necessary to consider the compatibility of the data on the transmitting end and on the data receiver end. Also, even if the data receiver is damaged or stolen, the fundamental data is safe, and security problems do not arise. In addition, because the data receiver handles simple bit-mapped data, and is being able to use a low-priced CPU, it is possible to maintain the functional value of that CPU for a long time. Furthermore, because the handled data is bit-mapped data and the task of installing high-performance application software becomes unnecessary, it is also easier to place an interface between it and the host computer, etc. Furthermore, when the number of colors is few, the data is received with the compression rate being increased, and it becomes possible to receive data having a large display area in a short time.

Accordingly, the objects of the present invention are to make a light-weight terminal, to remove unnecessary worries of theft of the data and obsolescence of the CPU, to remove the necessity for installing compatibility upgrades, and the like, and to remove considerations of data security, and the like. A further object of the present invention is to make easy and high-efficiency data compression possible.

BRIEF DESCRIPTION OF THE DRAWINGS

FIG. 7 is a table for explaining the action of the index converter in FIG. 2.

FIG. 8 is a table for explaining the contents of the color conversion table in the index converter in FIG. 2.

FIG. 16 is a drawing showing the encoding system and decoding system for a multicolored image of the prior art.

FIG. 17 is a drawing explaining the reference pixel system used in the data compression of the prior art.

FIG. 18 is a drawing for explaining the method of assigning indexes in order of scanning, being one for data compression of the prior art.

FIG. 19 is a drawing showing the structure of an mathematical type entropy encoder used in data compression of the present invention and the prior art.

DETAILED DESCRIPTION OF PREFERRED EMBODIMENTS

Figure 1:
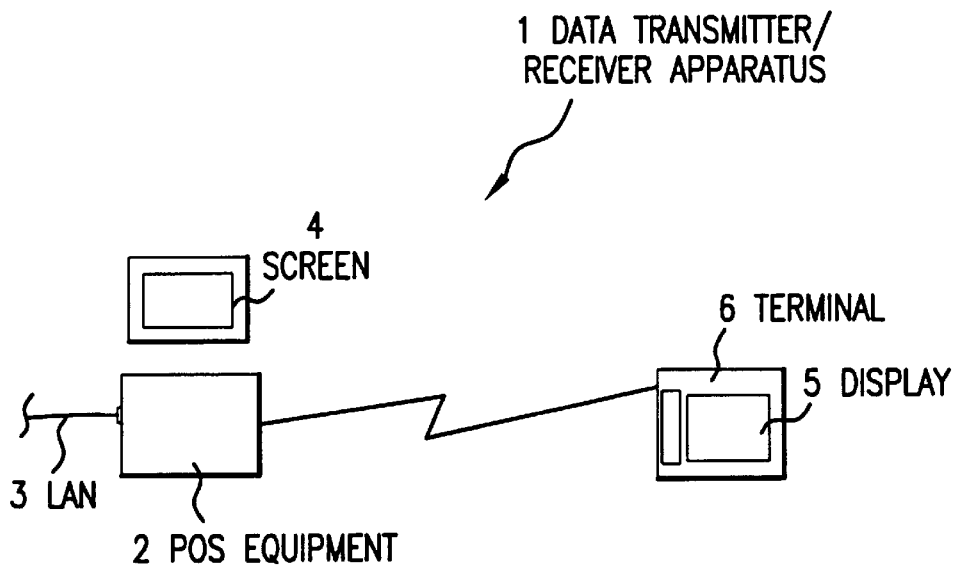
FIG. 1 is a drawing showing a preferred embodiment of the data transmitter/receiver apparatus of the present invention.

Examples of preferred embodiments of the present invention are explained below based on FIGS. 1 through FIG. 14.

The equipment shown in this preferred embodiment includes a data transmitter/receiver apparatus 1 using POS equipment 2 set up, for example, in a retail store. That is, the data transmitter/receiver apparatus 1 comprises POS equipment 2 that calls up the data at the host end (not illustrated) via a LAN 3 and displays it on its screen 4, and a terminal 6 that receives by wireless interface or cable the data displayed on that screen 4 and displays it to its display component 5. In addition to having the functions of register equipment, the POS equipment 2 transmits the display contents of its screen as bit-mapped data to the terminal 6.

Figure 2:
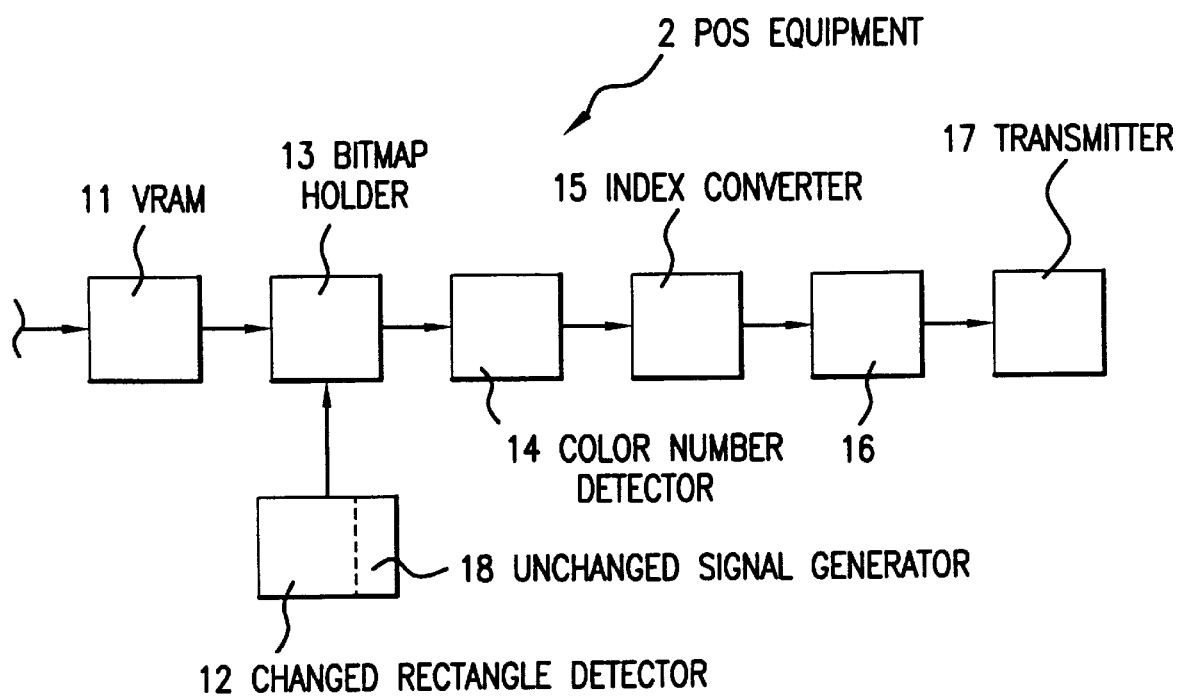
FIG. 2 is a block drawing showing the essential configuration of the POS equipment in FIG. 1.
Figure 3:
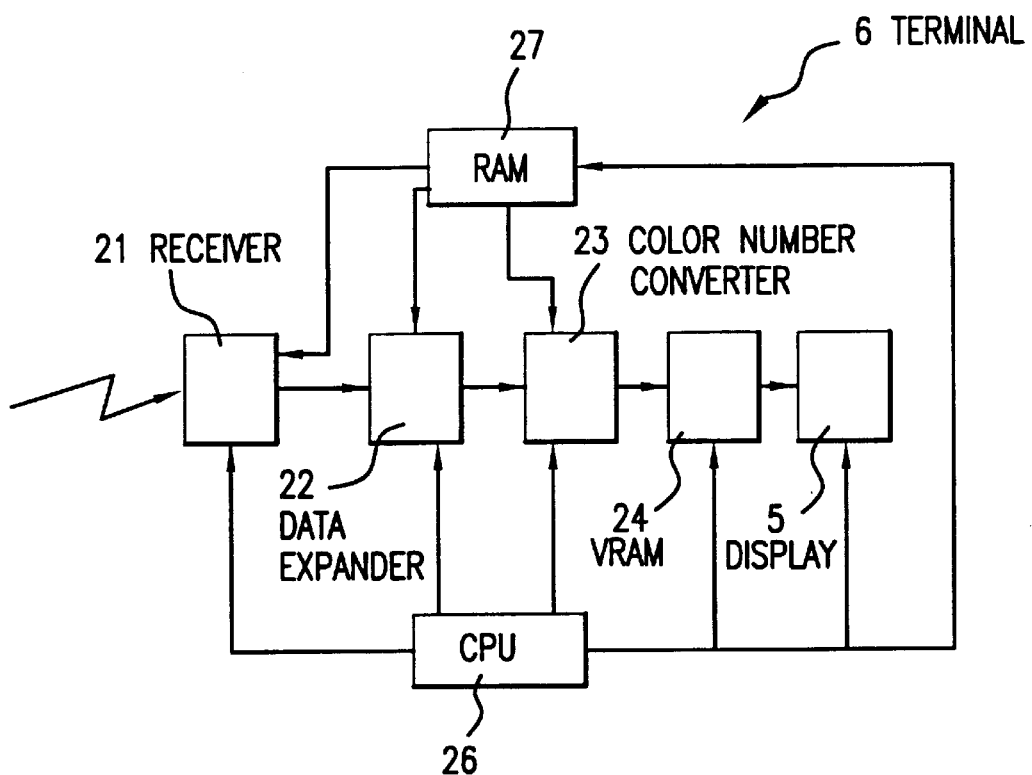
FIG. 3 is a block drawing showing the essential configuration of the terminal in FIG. 1.

The over-all configuration of the POS equipment 2 and the terminal 6 of this data transmitter/receiver apparatus 1, is explained below. FIG. 2 shows POS equipment 2 as a data transmitter including a VRAM 11 (as a screen memory) that is controlled by a CPU (not illustrated) inside the POS equipment 2 and stores the bit-mapped data displayed on the screen 4, a changed rectangle detector 12 that detects the changed regions against the screen one screen before by comparing the bit-mapped data, a bit map holder 13 that acquires the bit-mapped data of the changed regions from the VRAM 11, a color number detector 14 that detects the number of colors of the bit-mapped data in the changed regions, an index converter 15 that assigns the indexes representing each block of pixels with a value of a smaller number of bits as the number of colors detected by this color number detector 14 gets smaller, a data compressor 16 that compresses the bit-mapped data using the indexes assigned by this index converter 15, and a transmitter 17 that transmits by wireless interface the data compressed by the data compressor 16. The changed rectangle detector 12 has an unchanged signal generator 18 as described below.

Here, the CPU inside the POS equipment 2 is high-speed and high-performance. The POS equipment 2 is also furnished with a high-performance OS, various types of application software, a hard disk drive (HDD) with, for example, 1 GB of memory, and 16 MB or more of RAM. The VRAM 11 is a so-called video RAM, and in this preferred embodiment, it stores data of 640 bit horizontal and 480 bit vertical as bit-mapped data. In order to eliminate flickering when changing screen, two screens worth of memory may be stored in the VRAM 11. Also, the screen 4 may be a 1,024 bit horizontal by 768 bit vertical, high-resolution screen, and the VRAM 11 may he correspondingly configured.

Meanwhile, the terminal 6 may be the data receiver comprising a receiver 21 that receives the bit-mapped data, an expander 22 that expands that bit-mapped data, a color number converter 23 that specifies each index, for which a value of a smaller number of bits as the number of colors detected decreases is assigned to the index representing each block of pixels, based on a signal indicating the number of colors in each specified block of the bit-mapped data, a screen memory, VRAM 24 that stores the bit-mapped data based on the pixels for which color is specified by this color number converter 23, a display 5 that displays the bit-mapped data stored by the VRAM 24, a CPU 26 that controls the receiver 21, expander 22, converter 23, and VRAM 24, and a RAM 27 that functions as a memory component when the receiver 21 and the expander 22, etc., are operating.

The CPU 26 inside the terminal 6 provides lower performance and lower cost in comparison with the CPU 12 inside the POS equipment 2. However, in order to make this terminal 6 perform additional functions, the CPU 26 may be designed to perform the same functions as the CPU 12 inside the POS equipment 2. Here, the display 5 is composed of liquid crystals, and can form a screen having 640×480 bits. The receiver 21 is constructed from a general-purpose wireless LAN card on the market.

Figure 4:
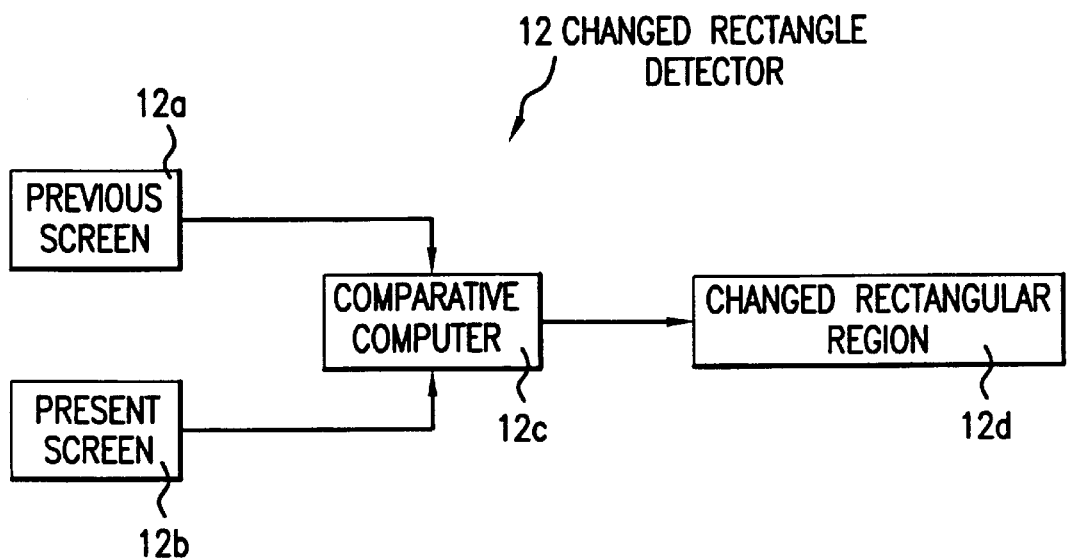
FIG. 4 is a drawing for explaining the structure of the changed rectangle detector in FIG. 2.

With this data transmitter/receiver apparatus 1, it is obvious when screen 4 is an image, but when it is text data, the screen data is made into bit-mapped data and transmitted to the terminal 6. Also, the received data is only the data of the portion relating to the changed rectangles to become the changed regions. The changed rectangle detector 12 for detecting these changed rectangles is constructed as shown in FIG. 4. That is, using the data of the VRAM 11, the differences between the previous screen 12a and the present screen 12b are computed by a comparative computer 12c, and extracted. These extracted portions become the modified rectangular regions 12d, and that information is sent to the bit map holder 13.

Figure 5:
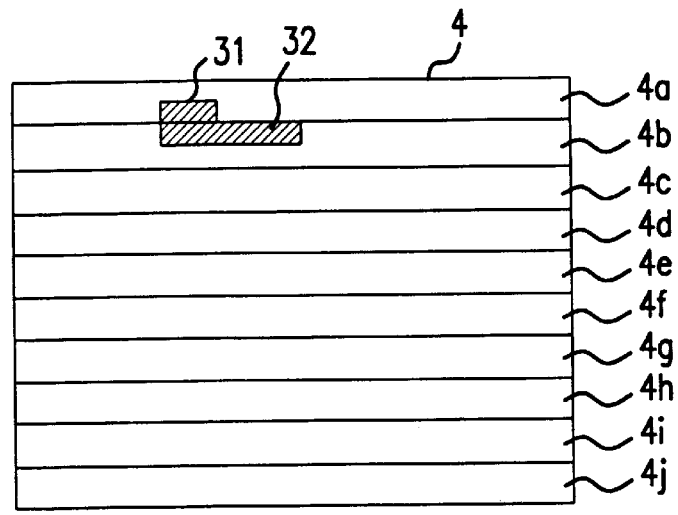
FIG. 5 is a drawing showing the screen structure and the changed rectangles of the POS equipment in FIG. 1.

This comparative computer 12c may compare the entirety of screen 4 at once, but in this preferred embodiment, as shown in FIG. 5, screen 4 is divided into, for example, ten parts in the vertical direction, the previous screen 12a is compared with each of those blocks 4a, . . . , 4j. Each block 4a, . . . , 4j becomes 640×48 bits, that is, about a size of 30K dots (pixels).

Figure 6A:
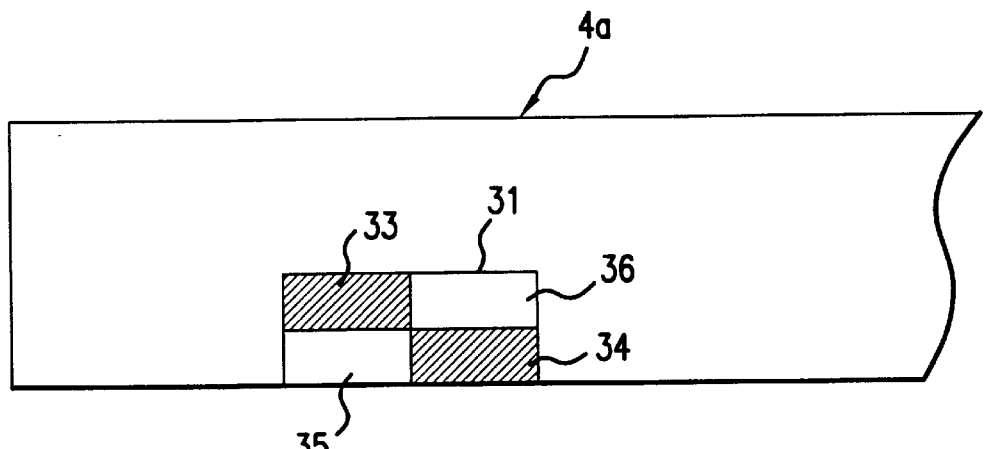
FIG. 6A is an expanded drawing of the first block of the screen in FIG. 5.
Figure 6B:
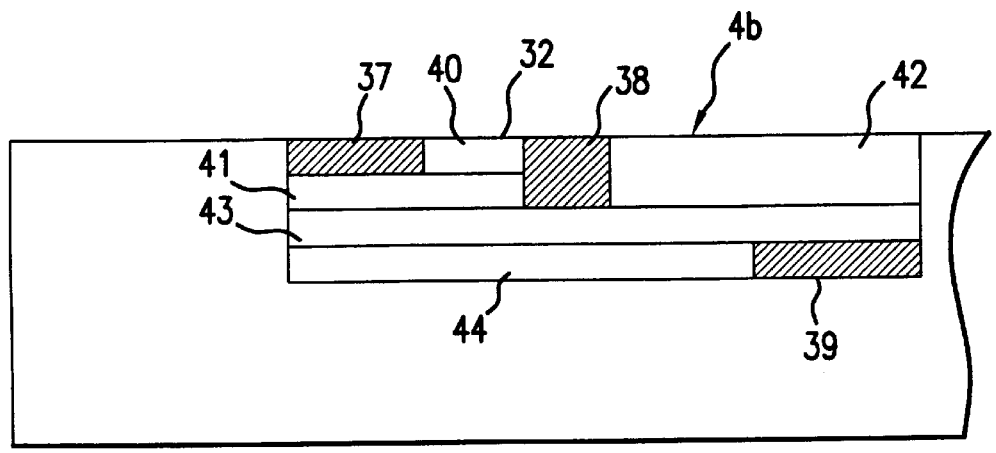
FIG. 6B is an expanded drawing of the second block of the screen in FIG. 5.

As shown in FIG. 5, if the extracted portions are the changed rectangle 31 of block 4a and the changed rectangle 32 of block 4b, the bit-mapped data transmitted related to this screen 4 represents only the changed rectangles 31 and 32. When the vertical and horizontal positions of the start of the changed location of the bit-mapped data are X1 and Y1, and the vertical and horizontal positions of the end are X2 and Y2, then each changed rectangle is calculated by |X1−X2|×|Y1−Y2|, and becomes the represented region. As shown in FIG. 6(A), when the changes are small, as in, for example, changed rectangles 33 and 34, then unchanged rectangular regions, such as 35 and 36 come into existence.

The changed rectangle detector 12, in addition to detecting the changed rectangles 31 and 32, also detects these small changed rectangles 33 and 34, and the unchanged rectangular regions 35 and 36. Also, in addition to instructing the bit map holder 13 to acquire the bit maps of the small changed rectangles 33 and 34 concerning the unchanged rectangular regions 35 and 36, a signal indicating that those portions are identical to the previous screen is generated by the unchanged signal generator 18, and sent to the bit map holder 13.

Similarly, concerning the changed rectangle 32 in block 4b, in addition to instructing the bit map holder 13 to acquire the bit maps of the small changed rectangles 37, 38 and 39, a signal is sent to the bit map holder 13 indicating that the unchanged rectangular regions 40, 41, 42, 43 and 44 are identical to the previous screen.

The bit map holder 13 accesses the bit-mapped data of the changed rectangles from the VRAM 11, being the portions with the small changed rectangles 33, 34, 37, 38 and 39 when stating the examples described above. That data is sent to the color number detector 14. A signal received from the changed rectangle detector 12 passes through the color number detector 14 and is sent to the index converter 15. The signal identifies the previous screen.

The color number detector 14 detects the number of colors of the changed rectangles within each block 4a, . . . , 4j, for example, the changed rectangles 31 and 32. The number of colors detected, the bit-mapped data within the changed rectangles, and the signal identifying the previous screen are variously sent to the index converter 15. Also, the index converter 15 has a color conversion table of different colors according to the number of colors detected by this color number detector 14, and converts them into indexes. For example, as in the example shown in FIG. 7, when the number of colors of the changed rectangles within each block 4a, . . . , 4j differ variously, index conversion is performed based on the standard shown in FIG. 8.

As shown in FIG. 8, for this standard, a four-byte color conversion table is used when there are up to four colors, a sixteen-byte table is used when there are up to sixteen colors, and no table is used when there are seventeen or more colors. That is, when the number of colors is up to four colors, an index having the four types of bit displays, being "00," "01," "10," and "11," is allocated in place of the original index. Also, because each index has an original index consisting of an eight-bit table, it becomes a four-byte color conversion table. In this manner, while the original index has 256 colors and thus becomes an index for multi-colored images consisting of eight bits, the index can be compressed into two-bit data by the color conversion table when there are up to four colors. In the same manner, when there are up to sixteen colors, the index can be compressed into four-bit data. When there are seventeen or more colors, the index retains it, eight-bit data size, thus no particular color conversion table is prepared, and the original index is used.

The bit-mapped data within the changed rectangles represented by the index-converted index and the signal identifying the previous screen are sent together to the data compressor 16. The data compressor 16 compresses the data with an mathematical encoder that uses a run-length encoding method, and transmits that data to the transmitter 17. The data compressor 16, aside from run-length encoding, can appropriately use various compression schemes such as a method of using a state division of the reference pixels shown by the prior art, for example, a Markov model, and a method of taking the differences of the pixels before DPCM, and the like. Also, as the encoder, it is possible to use various types of entropy encoders.

The transmitter 17 transmits the compressed data as wireless signals to the terminal 6. Also, because the signals being transmitted make the object digital, they can be used when phase modulation and amplitude modulation are the modes of transmission. Also, the frequency band used can vary by several MHz. Further, it is possible to use wide-frequency bands such as pager circuits and satellite communications, etc. General-purpose wireless LAN cards sold on the market are used in this preferred embodiment.

Figure 9:
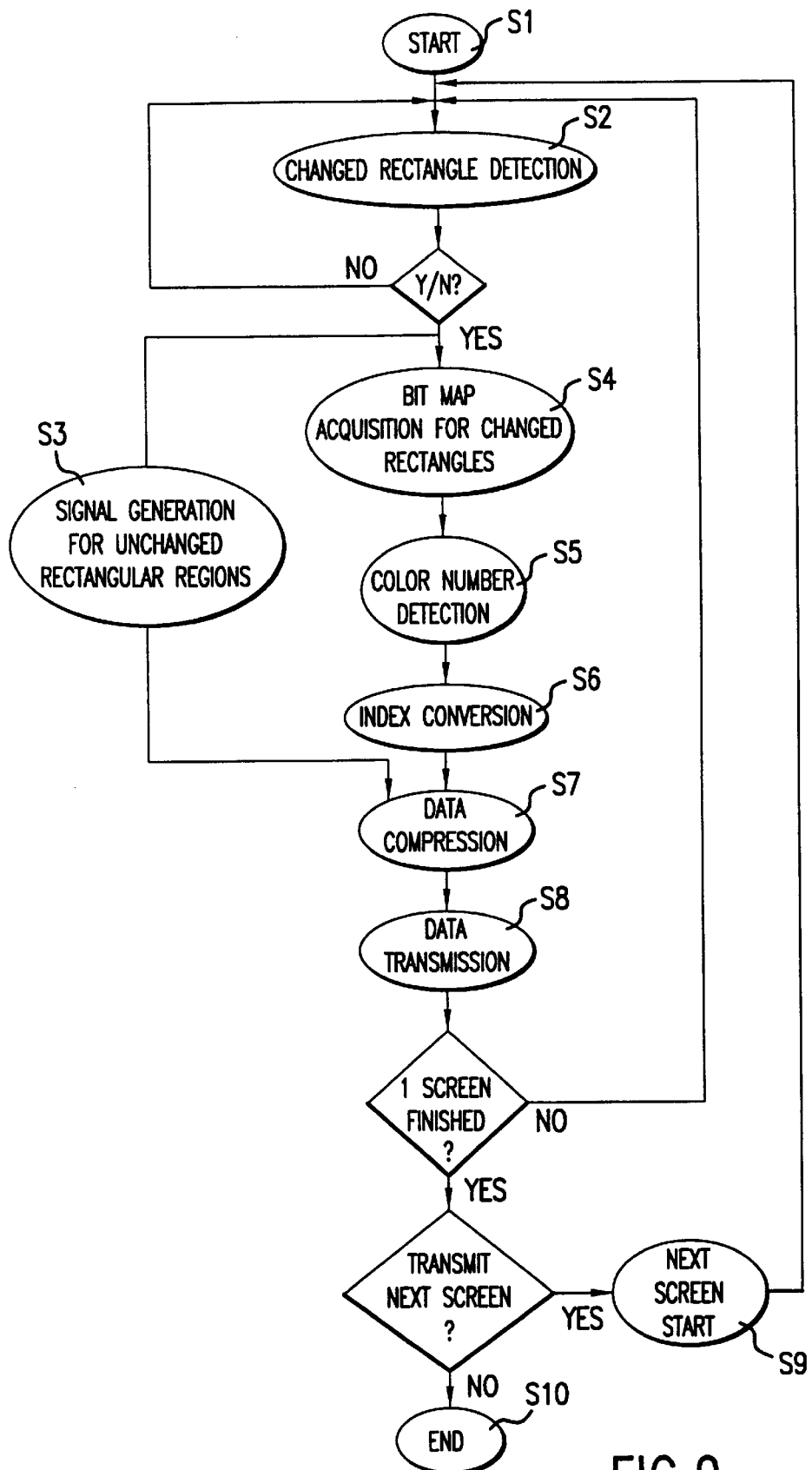
FIG. 9 is a flow chart for explaining the operation of the POS equipment in FIG. 2.
Figure 10:
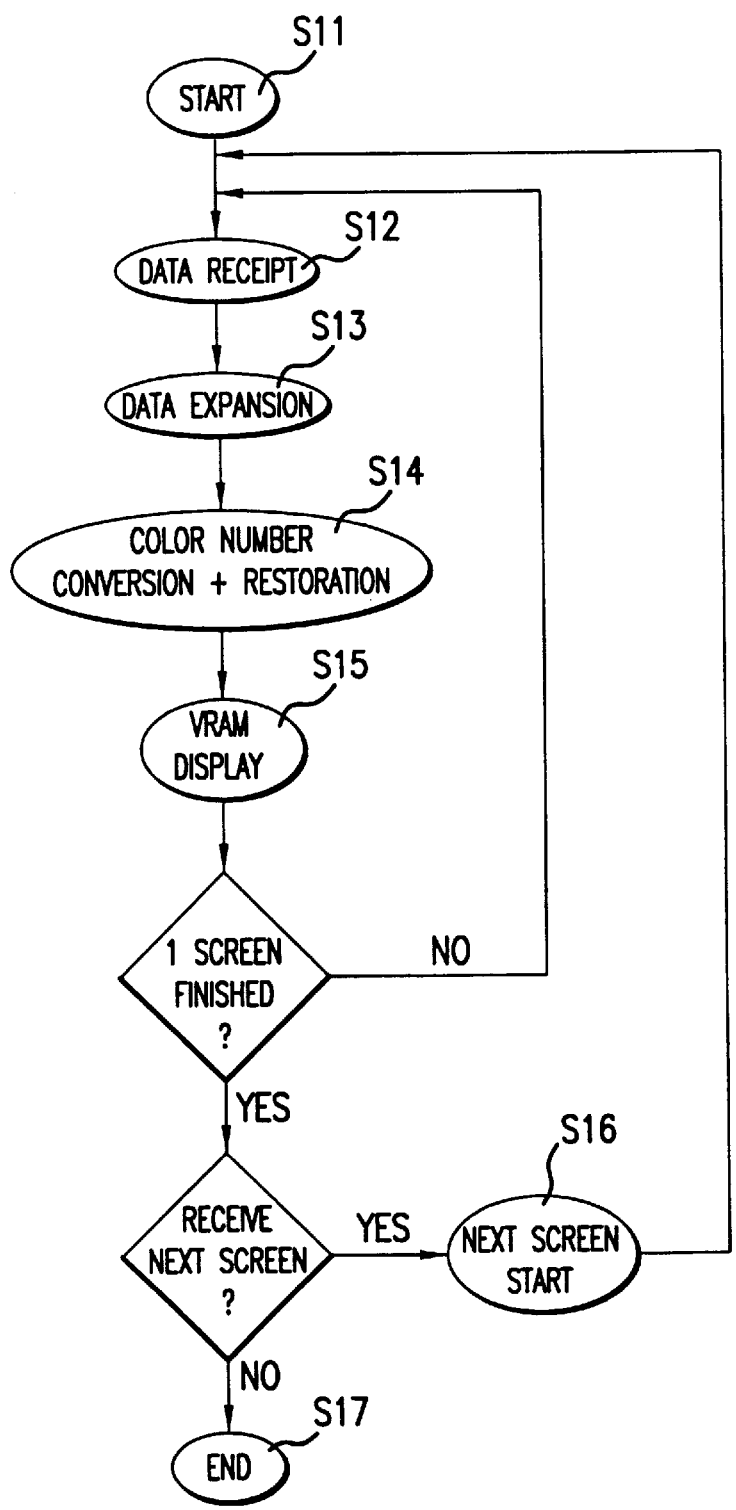
FIG. 10 is a flow chart for explaining the operation of the terminal in FIG. 3.

Next, the flow of operations in the data transmitter/receiver apparatus disclosed above is explained based on the flow charts of FIG. 9 and FIG. 10.

When the POS equipment 2 initiates data transmission (Step S1), first Step S2, changed rectangle detection, is executed to detect whether or not there are changed rectangles within the first block 4a, the screen having been divided into one-tenths blocks. If there are no changed rectangles, it immediately returns to Step 2 in order to detect the changed rectangles in the next block 4b. On the other hand, if there are changed rectangles, Step S3 is executed, whereby comparison of the unchanged rectangles and the other parts among those changed rectangular regions is performed, and a signal (signal for unchanged rectangular regions) is generated, indicating that the unchanged rectangular regions are identical to the previous screen. Also, the changed rectangles not located in Step S4, bit map acquisition, are executed to acquire the bit maps from the VRAM 11. When the screen data acquisition begins, because no previous screen used for comparison exist, the entirety of each block is recognized as a changed rectangle. Therefore, the return process due to the lack of changed rectangles and Step S3 are mutually exclusive.

After that, Step S5, color number detection within the changed rectangles, is performed. Also, Step S6, index conversion, is executed to convert data into indexes based on the standard of FIG. 8 shown before. In this manner, the changed rectangles are represented by changed rectangle data, consisting of the bit-mapped data represented by the index-converted indexes and the signals identifying the previous screen. Also, Step S7, data compression, is executed whereby this changed rectangle data is compressed by the data compressor 16. That compressed data is transmitted by Step S8, data transmission. In Step S7, data compression, the data is compressed by run-length encoding.

When one screen has been processed by this data transmission, the presence or absence of a next screen transmission is detected, and if there is a next screen transmission, processing advances to Step S9. However, when all of the ten blocks have not yet been finished, processing returns to Step S2, changed rectangle detection. If the ten blocks have been finished and there is a next screen transmission, processing moves to Step S9, beginning of next screen. If there is no next screen transmission, this data transmitter/receiver apparatus 1 finishes data transmission (Step S10).

At the time of data transmission it is desirable to consider receiving errors and the transmission environment, and to use a method for the same data, for example, resending at once the data within one block several times, or resending as a whole the data within one screen. However, the data transmission also may be done once if a degree of receiving loss doesn't matter.

The terminal 6 to receive the data is ordinarily in the on state, and is always in a state able to receive. The terminal 6 may also be moved to the receiving state by being put into the operable state (power on state) and receiving a transmission start signal of the transmitted data. Also, the terminal 6 and POS equipment 2 may be manually turned on and simultaneously put into transmission and receiving modes.

When the terminal 6 starts receiving (Step S11), first Step S12, data receiving, is executed for the first block, and then Step S13, data expansion, is executed to expand that data. In Step S13, data expansion, the run-length-encoded signals are decoded by the algorithm opposite to the (encoding) algorithm. Various types of entropy decoders other than an mathematical decoder may be used.

The data-expanded data has the signals identifying the previous screen along with conversions to the original indexes based on a table identical to the previous color conversion table, and the data within the changed rectangles is restored (Step S14). This restored data, in addition to being stored in the VRAM 24, is displayed (Step S15) by the display 5. That is, for the data in the VRAM 24, only the changed rectangular parts are rewritten, and only those rewritten parts are displayed by the display 5.

Each step S12, S13, S14, and S15 are repeated until the data of all ten blocks is displayed. Also, when one screen is finished, it is determined whether or not receipt of the next screen has begun, and if there is a receipt, then Step S16, next screen start, is executed. When the data of the next screen is not being received, regeneration display is finished (Step S17). When data transmission sends a signal indicating that screen data transmission has finished, the terminal 6 receives that signal and processing enters Step S17, end.

Figure 11:
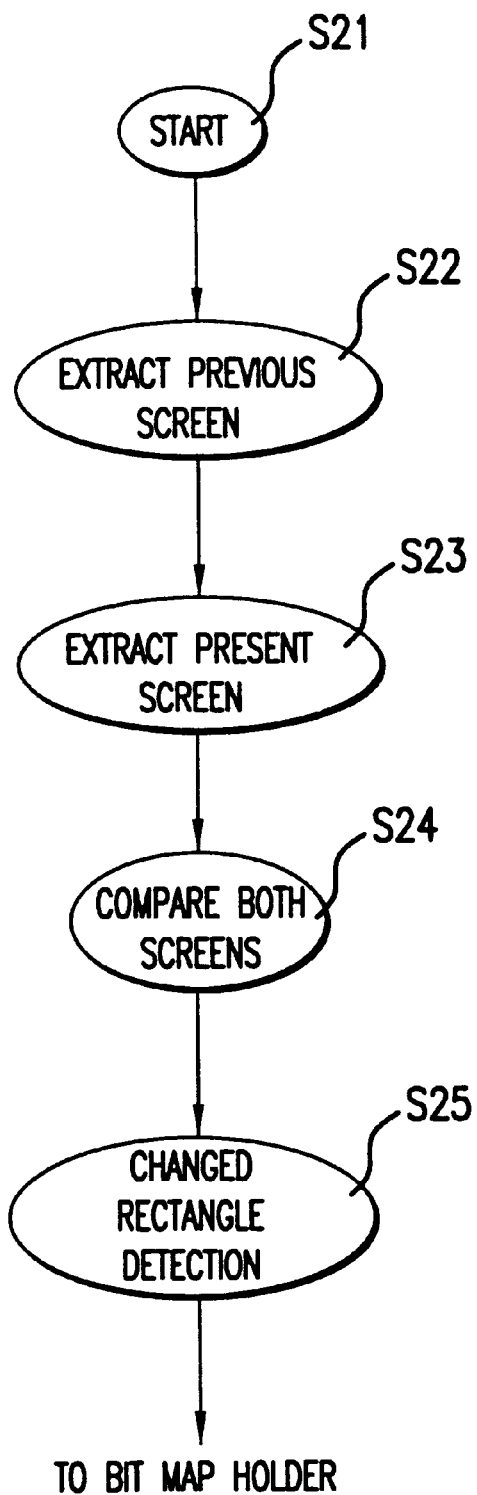
FIG. 11 is a flow chart for explaining the operation of the changed rectangle detector in FIG. 4.

Step S2, changed rectangle detection, consists of the steps in FIG. 11. When Step S1, start, is executed, Step S2, changed rectangle detection, is started (Step S21). Thereupon, the previous screen stored in the VRAM 11 is extracted (Step S22). Next the present screen newly input into the VRAM 11 is extracted (Step S23), and the two screens are compared (Step S24). Also, the changed rectangles are detected by the differences of both screens (Step S25), and that data is transmitted to the bit map holder 13.

Figure 12:
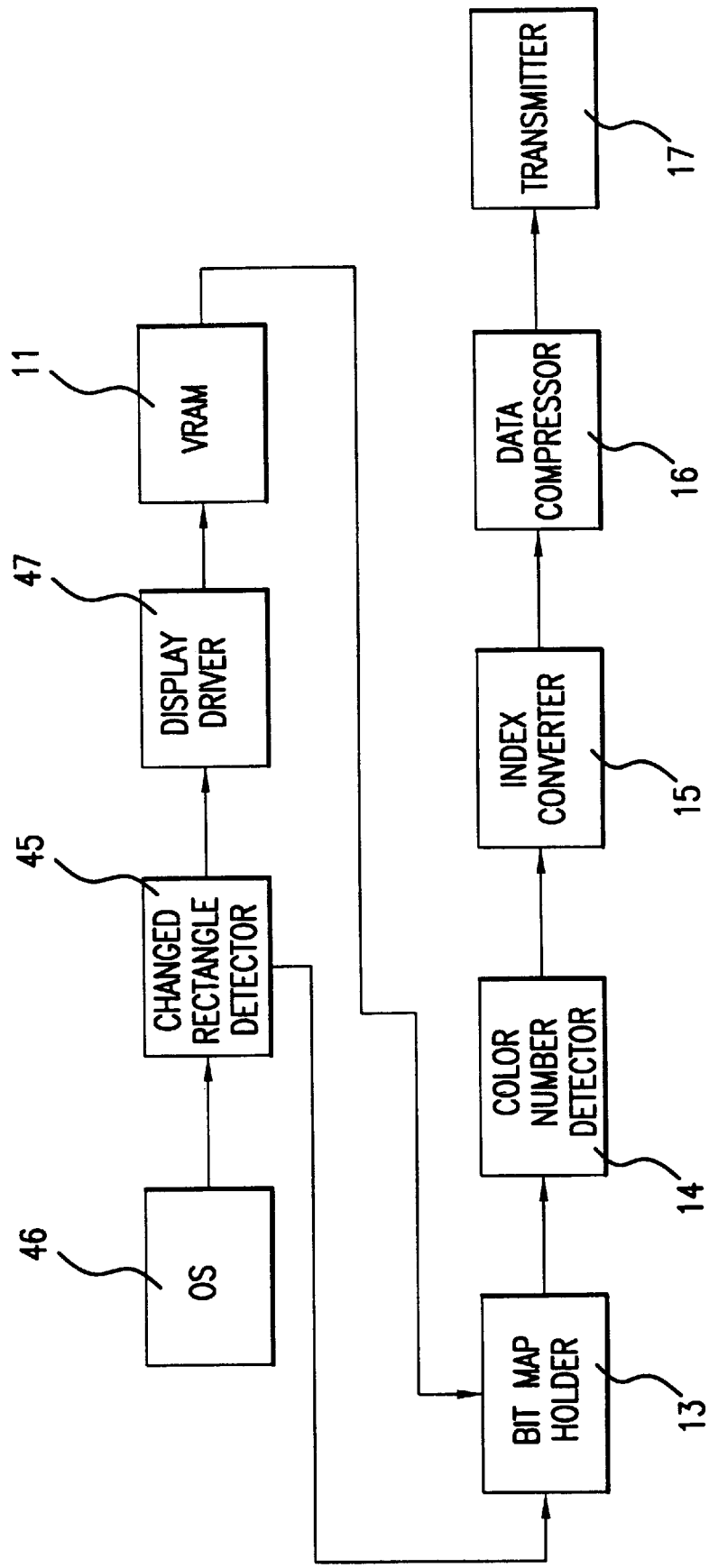
FIG. 12 a drawing showing the second preferred embodiment of the data transmitter used in the data transmitter/receiver apparatus of the present invention.
Figure 13:
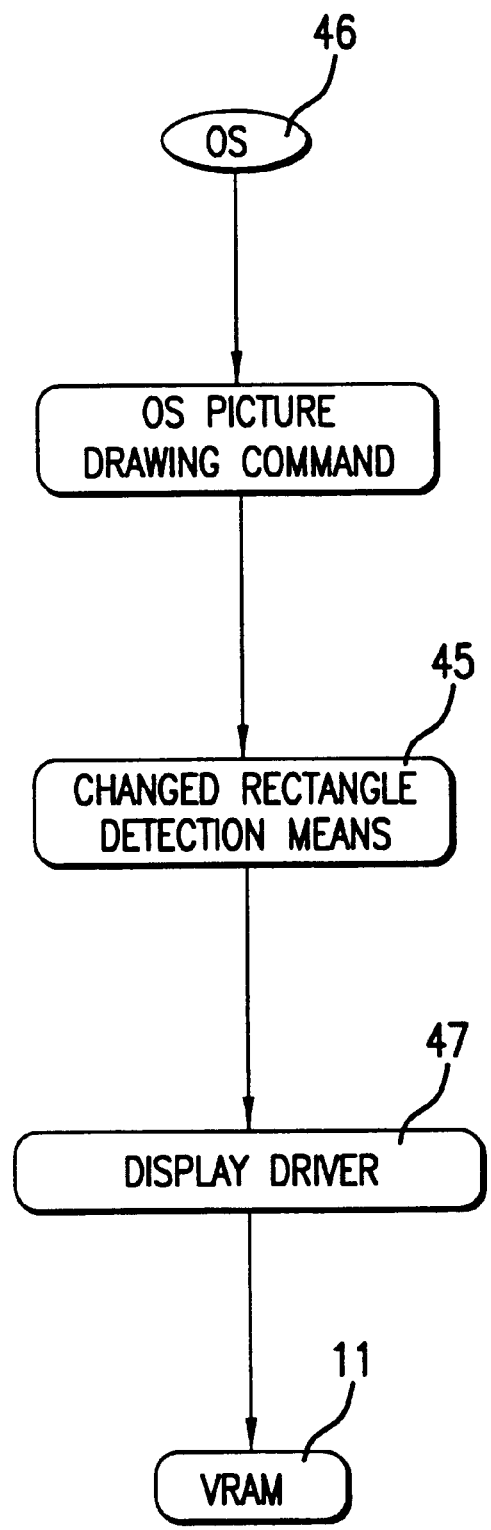
FIG. 13 is a flow chart for explaining the operation of the changed rectangle detector in FIG. 12.

Next a second preferred embodiment, with an alternative changed rectangle detection method, is explained based on FIG. 12 and FIG. 13. The components identical with the first preferred embodiment shown in FIG. 1 are represented having the identical symbols, and their detailed explanation is omitted.

This detection method, speaking of the picture drawing command to the VRAM 11, is performed in the following manner. Normally, the picture drawing command from the OS 46 of the POS equipment 2 is relayed to the display driver 47, and the picture is drawn in the VRAM 11. The changed rectangle detector 45 in this second preferred embodiment, as shown in FIG. 12 and FIG. 13, is inserted in between the OS 46 and the display driver 47. Therefore, the picture drawing command from the OS 46 is relayed to the display driver 47 by passing through the changed rectangle detector 45. At this time, the changed rectangle detector 45 extracts, by copying, the parts changed with the previous screen. Meanwhile, the picture drawing command itself is relayed to the display driver 47 and the picture is conventionally drawn in the VRAM 11.

The changed parts extracted by the changed rectangle detector 45 are relayed to the bit map holder 13, and the bit-mapped data of said parts is accessed from the VRAM 11. The processing after that is identical with that of the first preferred embodiment before. The changed rectangle detector 45 of this second preferred embodiment performs the role of the so-called dummy driver, and the configuration can be simplified.

In each of the discussed preferred embodiments, because the screen data is transmitted as bit-mapped data, the broad applicability becomes greater in comparison with the conventional uses. That is, because the conventional command systems are governed by the OS used by the host end computer as the data transmitter, the data cannot be restored on a terminal having a different OS. However, in these preferred embodiments, because bit-mapped data is used, it becomes possible to restore the screens on terminals using other OSs. Also, for the data transmitter/receiver apparatus 1 of this preferred embodiment, during the hours when its POS equipment 2 is unused as a register, operators handling the POS equipment 2 can carry out such operations as product re-shelving and stock-taking. Therefore, it is possible to reduce the cost of human resources while increasing the operating hours of the POS equipment 2.

Each of the preferred embodiments described above are examples of preferred embodiments well-suited to the present invention, but the present invention is not limited to these, and various modified embodiments are possible in the scope not deviating from the elements of the present invention. For example, as the terminal 6, an ordinary computer having the latest CPU and an HDD, and the like, installed, may be used. Also, rather than eight-bit (256 colors) images, the multicolored images may include four-bit (sixteen colors), sixteen-bit (64,000 colors), and other bit counts as needed. Furthermore, the conversion table may be modified so that at least one of eight byte (up to eight colors) tables may be put between the four-byte and sixteen-byte tables, and images of other bit counts than four-bit and sixteen-bit, as described above, may be used. In addition, if the terminal 6 shown by each of the preferred embodiments described above and each of the preferred embodiments described below is an Internet terminal, that is, one which operates by TCP/IP, the scope of application can become broader, and the costs can be reduced in price. Furthermore, regarding screen resolution, aside from 640×480-dot and 1024×768-dot, screens of 800×600 dots, 1280×1024 dots, and other resolutions may be used.

Also, as the block size to divide the screen 4, a block of one tenth the size of the screen 4, for example, 640×48 dots are appropriate when it is a 640×480-dot screen 4, but if it is at or above the extent of 640×20 dots, having been divided into twenty-four blocks, the header information to represent the blocks becomes desirably small. Also, if it is at or below 640×96 dots, having been divided into five blocks, the likelihood of the number of colors becoming too great is desirably reduced. When the screen is designed with a high resolution, for example, 1024×768-dot high-resolution screens 4, and the like, the number of pixels can differ within the divided blocks. It is preferable to set the number of pixels to 10–50K if the number of pixels do not have a substantial amount of header information. In addition, smaller blocks of pixels become more desirable as the number of colors within each block decreases.

Figure 14:
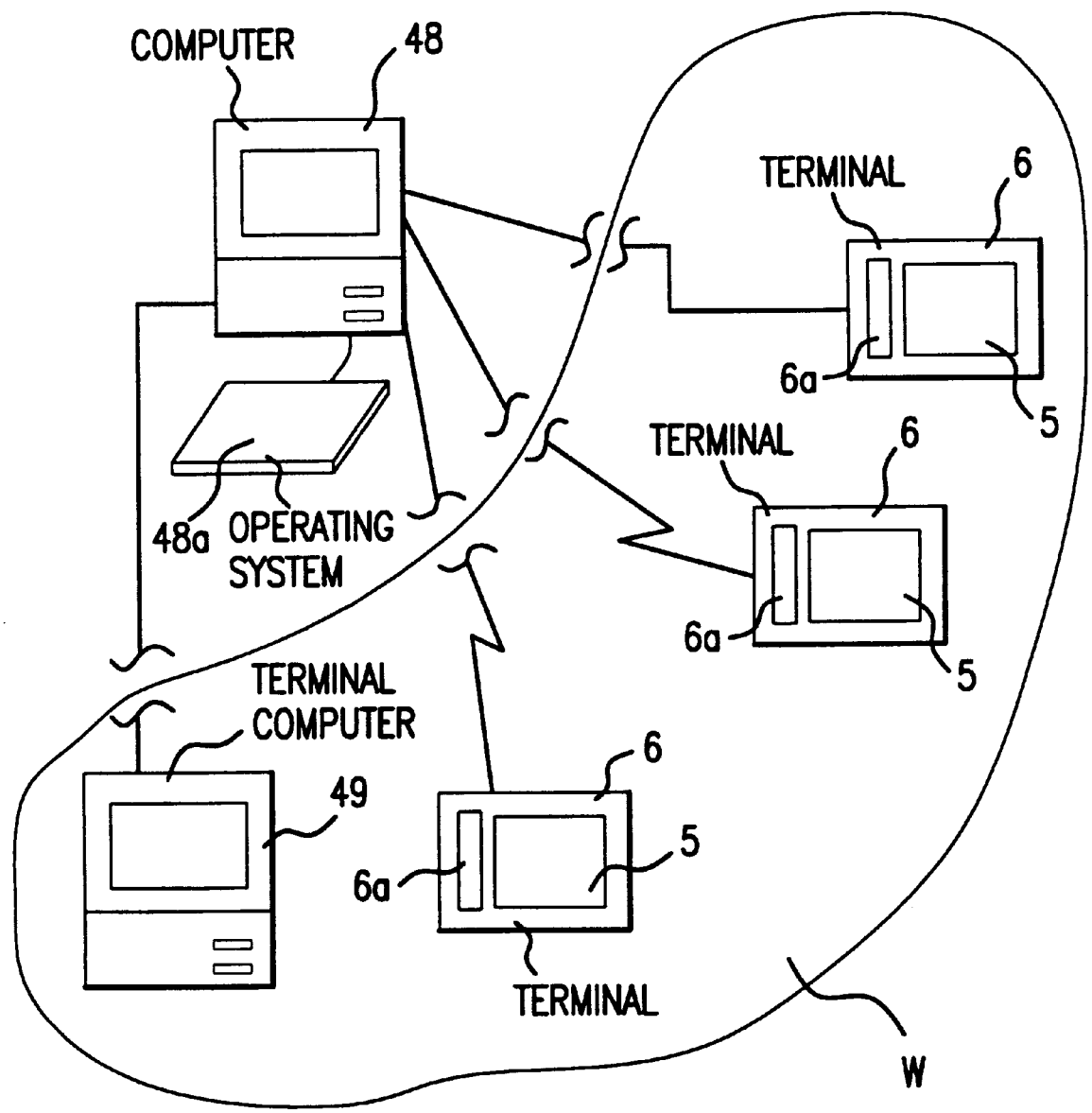
FIG. 14 is a drawing for explaining another example of application of the data transmitter/receiver apparatus of the present invention.
Figure 15:
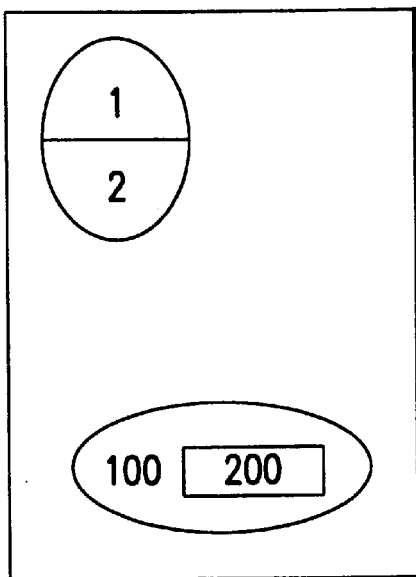
FIG. 15 is a drawing for explaining the properties of a multicolored image transmitted in data transmission and receiving systems of the present invention and the prior art.

Furthermore, the data transmitter/receiver apparatus of each of the preferred embodiments described above were performing in-shop work in connection with POS equipment 2, but can be used for various other uses. For example, as shown in FIG. 14, it is possible to arrange for customers to extract all kinds of information using an operating component 6a, by placing the host computer 48 outside the shop, and placing multiple terminals 6 inside the shop at locations easily operated by the customers.

Because the terminal 6 is small-scale and doesn't take much space, it can be put in various places. Furthermore, because the in-shop layout is easy to change, it is possible to keep down the generation of costs during in-shop remodeling. In addition, depending upon the operating system 48a of the computer 48, operation of the terminal 6 also becomes possible. Therefore, it is possible to realize a more interactive system between the computer 48 and the terminal 6. However, because the system now becomes multi-user, when the terminal 6 accesses the computer 48, it may be necessary to obtain the access rights before accessing and extracting the data. In addition, the computer 48 and terminal computers 49 connected by cables to this system may also be placed in the open spaces and rest areas located inside the shop.

Also, this data transmitter/receiver apparatus may be used in the office. For example, when having left one's seat at a meeting, or the like, the data on one's own desktop computer as host can be utilized from another location by cabled or wireless LAN. Furthermore, the host computer may not be one's own computer, but it may be a computer used commonly by company personnel or department members. However, it may be necessary to obtain access rights before accessing the computer, just as in FIG. 14.

Other than the uses as described above, it may be used in various types of training classes such as computer training classes by making the screen status of the instructor's computer display to the multiple terminals 6 of those taking the classes, or by making the terminals 6 of those taking the classes display data to the instructor's computer. Similarly, this data transmitter/receiver apparatus can be used in other classes, such as mathematics, etc., in elementary school.

Also, regarding the wireless LAN cards used in the transmitter 17 and the receiver 21, in order to make the user able to register a program driver, a writeable memory device, for example an HDD, and a writeable memory card may be attached to the transmitting end. It is possible to change to a better-performance wireless LAN card by providing a programmable ROM card. When using such general-purpose wireless LAN cards sold on the market, the correspondence becomes easier and future increases in performance become possible.

Furthermore, in the preferred embodiments described above, the terminal 6 was a dedicated terminal machine, but a general PC (personal computer), as shown in FIG. 14, may be used as the terminal 6. Thus, in addition to being able to connect to multiple hosts, various benefits, such as being able to open independently acting windows from the terminal 6 are possible.

After having sent the bit-mapped data to the terminal 6, command controls such as scrolling, etc., at the terminal end may be performed. Such commands may be transferred along with the bit-mapped data to the terminal 6 end from the transmitting host end, being the POS equipment 2. Thus, it becomes possible to use the data sent to the terminal 6. Also, regarding this command transfer, it is possible to reduce the quantity of data by using the copy command as follows.

After performing a copy within the terminal device 6, the copy source rectangle and the copy destination rectangle are stored in the data transmitter. When beginning to send the present screen 12b to the terminal 6, if the copied information is stored, it is checked to determine whether the contents of the copy source rectangle of the previous screen 12a and the contents of the copy destination rectangle of the present screen 12b are matching. If they are matching, the copy command is transmitted, the copy source rectangle of the previous screen 12a is copied to part of the copy destination of the present screen 12b, and the copy source rectangle is copied to the copy destination rectangle for the stored previous screen 12a. Thus, because the copy destination rectangles of the previous screen 12a and the present screen 12b are matching, those parts do not become changed rectangular regions, and the data in those parts is compressed. Accordingly, the quantity of data transmitted is reduced.

In this manner, aside from employing the command by sensing the copy action, it is possible to adopt methods of using commands by comparing the contents of the screen of the terminal 6 and extracting the copied parts. For example, regarding the scroll action, it is possible to compress the data by detecting the matching lines of the previous screen 12a and the present screen 12b, determine that it has scrolled if n lines or more are matched, and employ the copy command in the same manner as the previous example. Here, n is an integer of 1 or more. There are cases where one line matches by coincidence when n is 1, and in order to eliminate such cases, n=1 is eliminated.

What is claimed is:

1. A data transmitter/receiver apparatus that transmits screen data by wireless interface or by cable, comprising:

a terminal;

screen data transmitted to the terminal;

bit-mapped data representing the screen data;

a display connected to the terminal, the display displaying the bit-mapped data;

a plurality of blocks separating said bit-mapped data;

a plurality of indexes representing conversions of the bit-mapped data;

wherein the number of bits in the indexes representing each block of pixels decreases as the number of colors used within each of the blocks decreases and is compressed prior to transmitting the bit mapped-data.

2. The data transmitter/receiver apparatus as defined in claim 1, wherein said bit-mapped data is divided into blocks in units of 10K–50K pixels.

3. A data transmitter/receiver apparatus that transmits host computer screen data by wireless or by cable to a terminal, comprising:

the terminal;

a screen divided into blocks while bit-mapping the screen data; and a plurality of indexes representing converted blocks of pixel data to be transmitted, the indexes having a smaller number of bits than the blocks of pixels to transmit, wherein the size of each index representing each block of pixels decreases as the number of colors used within each block decreases, and is compressed prior to transmitting the bit-mapped data to the terminal and displaying it on the screen.

4. A data transmitter/receiver apparatus that transmits screen data by wireless or by cable to a terminal, comprising:

a bit-mapped screen;

a changed rectangle detector that detects only the portions changed in the data composing one screen by comparing with the screen one screen before, and transmits the data of the changed rectangular portion when the changed rectangle detector has detected as a changed rectangle the region computed by |X1–X2|×|Y1–Y2|, taking the vertical and horizontal position of the start of the bit-mapped data in a changed location as X1 and Y1, and the vertical and horizontal position of the end as X2 and X2;

a color number detector that detects the number of colors among said changed rectangles;

an index converter that makes the value of the indexes representing each block of pixels as indexes having a value of a smaller number of bits when the number of colors detected by the color number detector is smaller; and a data compressor that compresses the bit-mapped data using these new indexes.

5. The data transmitter/receiver apparatus is defined in claim 4, further comprising:

an unchanged signal generator that generates an unchanged signal when there is an unchanged rectangle among said data, and a signal indicating that the unchanged rectangular region is identical to the previous screen.

6. The data transmitter/receiver apparatus as defined in claim 4, wherein said bit-mapped data is divided into blocks in units of 10K–50K pixels, and said changed rectangles are obtained within those divided blocks.

7. A data compression method, comprising:

providing bit-mapped data on a screen;

compressing the bit-mapped data into indexes having a smaller number of bits;

making the number of bits in the indexes representing each block of pixels smaller as the number of colors used within fixed regions of each screen is smaller; and compressing the bit-mapped data in the fixed regions.

8. The data compression method as defined in claim 7, further comprising:

dividing the screens into blocks in units of 10K–50K pixels, wherein each of the blocks becomes one of the fixed regions.

9. A data compression method, comprising:

comparing bit-mapped data from one screen with bit-mapped data from a previous screen to determine locations of changed data;

computing a changed rectangular region as $|X1-X2| \times |Y1-Y2|$, taking the vertical and horizontal position of the start of a location of changed bit-mapped data as X1 and Y1, and the vertical and horizontal position of the end of the location of changed bit-mapped data as X2 and Y2;

extracting only the bit-mapped data of the changed rectangular regions;

detecting a number of colors among said changed rectangles;

making a plurality of indexes representing each block of pixels as indexes having a smaller number of bits as the number of colors is smaller; and compressing the bit-mapped data using the indexes.

10. The data compression method as defined in claim 9, further comprising generating a signal when there is an unchanged rectangular region among said data to indicate that the unchanged rectangular region is identical to the previous screen.

11. The data compression method as defined in claim 9, further comprising dividing the bit-mapped data into blocks in units of 10K–50K pixels, and obtaining said changed rectangular regions from the divided blocks.

12. A data transmitter that transmits host computer screen data by wireless or by cable to a terminal, comprising:

a screen memory that structures a plurality of host computer screens with bit-mapped data and stores the bit-mapped data;

a change detector that detects changed regions against the screen one screen before in the screen data;

a bit map holder that acquires the bit-mapped data of the changed regions from the screen memory;

a color number detector that detects the number of colors among the changed regions of the bit-mapped data;

an index converter that makes the indexes representing each block of pixels as indexes having a value of a smaller number of bits as the number of colors detected by the color number detector is smaller;

a data compressor that compresses the bit-mapped data using the indexes provided by the index converter; and a transmitter that transmits the data compressed by the data compressor.

13. The data transmitter as defined in claim 12, wherein the bit-mapped data stored by said screen memory is made as data having a bit map structure of 1024×786 pixels.

14. The data transmitter as defined in claim 13, wherein a unit as object of detection when the changed regions are detected by said change detector is a block obtained by dividing the screen into a plurality of blocks.

15. A data transmitter that transmits host computer screen data by wireless or by cable to a terminal, comprising:

a screen memory that structures the host computer screens with bit-mapped data and stores the bit-mapped data;

a change detector that detects changed regions against the screen one screen before in the data;

a bit map holder that acquires the bit-mapped data of the changed regions from the screen memory;

a data compressor that compresses the bit-mapped data of the changed regions; and a transmitter that transmits the data compressed by the data compressor, a color number detector that detects the number of colors in said changed rectangles, and an index converter that provides to each block of pixels an index of a different number of bits according to the number of colors detected by the color number detector, wherein the change detector includes a changed rectangle detector that detects as a changed region the changed rectangular region computed by $|X1-X2| \times |Y1-Y2|$, taking the vertical and horizontal position of the start of the changed location of the bit-mapped data as X1 and Y1, the vertical and horizontal position of the end of the changed location as X2 and Y2, the changed rectangular detector generates a signal when there is an unchanged rectangular region within said data to indicate that the unchanged rectangular region is identical to the previous screen, the color number detector detect the number of colors for the rectangular regions other than the unchanged rectangular regions, and the index converter assigns to the indexes representing each block of pixels a value of a smaller number of bits as the number of colors detected is smaller.

16. A data receiver, comprising:

a receiver for receiving bit-mapped data composing screens;

a data expander for expanding the bit-mapped data;

a color number converter that specifies each index, for which a value of a smaller number of bits is assigned to the index representing each block of pixels as a number of colors detected is smaller, based on a signal indicating the number of colors in each specified block of the bit-mapped data;

a screen memory that stores the bit-mapped data based on the block of pixels for which color is specified by the color number converter; and a display component for displaying the bit-mapped data stored by the screen memory.

* * * * *